United States Patent [19]

Engström et al.

[11] Patent Number: 5,619,046

[45] Date of Patent: Apr. 8, 1997

[54] METHOD OF MANUFACTURING A MEASURING DEVICE

[75] Inventors: Olof Engström, Hindås; Hans Richert, Partille, both of Sweden

[73] Assignee: AB Volvo, Sweden

[21] Appl. No.: 331,520

[22] PCT Filed: May 5, 1993

[86] PCT No.: PCT/SE93/00393

§ 371 Date: Mar. 6, 1995

§ 102(e) Date: Mar. 6, 1995

[87] PCT Pub. No.: WO93/22644

PCT Pub. Date: Nov. 11, 1993

[30] Foreign Application Priority Data

May 5, 1992 [SE] Sweden ........................... 9201439

[51] Int. Cl.⁶ ........................................... H01L 29/182
[52] U.S. Cl. .................. 257/82; 73/800; 73/723; 73/728; 73/862.59; 257/98; 257/417; 257/418; 257/419; 250/231.19; 250/227.21; 250/227.23; 356/352; 438/27; 438/51
[58] Field of Search ........................ 257/80, 82, 98, 257/417, 418, 419; 73/715, 723, 728, 862.59, 800; 250/231.19, 227.21, 227.23; 356/352; 437/901, 228, 243, 927

[56] References Cited

U.S. PATENT DOCUMENTS

| 4,678,904 | 7/1987 | Saaski et al. | 250/227 |
|---|---|---|---|
| 4,682,500 | 7/1987 | Uda | 73/705 |
| 4,825,262 | 4/1989 | Mallinson | 356/352 |
| 4,884,450 | 12/1989 | Greenwood et al. | 73/702 |
| 4,933,545 | 6/1990 | Saaski et al. | 250/227.14 |
| 4,942,767 | 7/1990 | Haritonidis et al. | 73/705 |
| 4,983,824 | 1/1991 | Saaski et al. | 250/227.27 |
| 5,195,374 | 3/1993 | Parsons et al. | 73/705 X |
| 5,447,075 | 9/1995 | Hockaday | 73/778 X |

FOREIGN PATENT DOCUMENTS

| 2186360 | 2/1986 | European Pat. Off. . |
|---|---|---|
| 0196784 | 10/1986 | European Pat. Off. . |
| 0310225 | 4/1989 | European Pat. Off. . |

*Primary Examiner*—William Mintel
*Attorney, Agent, or Firm*—Samuels, Gauthier, Stevens & Reppert

[57] ABSTRACT

The invention concerns a method of manufacturing a measuring device of the Fabry-Pérot resonator type. The invention likewise concerns a measuring device manufactured by means of the method. The measuring device is particularly intended for measurement of the pressures inside engine cylinders and comprises a cavity and a first part and a second part, said two parts sandwiching the cavity between them. At least the first part, which consists of silicon, supports a spacer layer of silicon dioxide formed through thermal oxidation. The spacer layer which is partially removed through etching, is joined to the second part using the technique known as direct bonding (SDB).

10 Claims, 4 Drawing Sheets

METHOD OF MANUFACTURING A MEASURING DEVICE

BACKGROUND OF THE INVENTION

The subject invention concerns a method of manufacturing a measuring device. The invention also concerns a measuring device produced in accordance with the method.

A principal application of a device in accordance with the present invention is to measure the pressure in combustion engine cylinders. To optimize the efficiency of the engine it is desirable to be able to instantaneously measure the pressure of the exhaust gases inside the cylinder compression space. It would be advantageous to incorporate a device designed for this purpose in the existing ignition and fuel injection system of the vehicle which, with the aid of electronic means of suitable configuration, could result in more carefully controlled fuel injection conditions and a more advantageous combustion process. Consequently, it would be possible to achieve a more optimized ignition point and to obtain more complete fuel combustion with consequential improvement of the engine efficiency.

High pressures and temperatures and serious electrical disturbances are characteristic of the particularly extreme environmental conditions to which a pressure sensor that is positioned in the cylinder is exposed. In addition, pressure sensors of this type are to be installed in connection with the manufacturing process in a large number of vehicles produced in large series and thus be incorporated as one component of the electric system of the vehicle. A pressure sensor of this kind therefore must meet severe requirements with respect to accuracy, reliability and, not the least, low manufacturing costs and satisfactory reproducibility in the manufacturing process.

In view of the environmental conditions in the cylinder it is difficult to effect pressure measurements based on direct conversion to electrical quantities. A solution based on fiber optics according to which the sensor body consists mainly of silicon and the conversion of the signal is from pressure to a mechanical quantity which in turn is converted into an optical quantity transported by an optical fiber, would provide the advantages required to solve the measuring problem. However, to date no sensors exist that are able to withstand the environmental conditions at a cost that is acceptable from a production-economical point of view.

Relevant devices in this aspect are pressure sensors based on the principle that the surrounding pressure affects the thickness of a cavity formed in the sensor and wherein optical interference is generated inside the cavity when incident light hits the cavity via an optical fiber. The method is based on the use of a resonator of the kind known as a Fabry-Pérot resonator. A fiber-optical device of this nature for pressure measurements is previously known from the German Patent Specification DE 3611852. This prior-art device includes a Fabry-Pérot resonator which is positioned at the end of an optical fiber. An optical signal supplied to the fiber is reflected by the Fabry-Pérot resonator at an intensity that is dependent on the pressure affecting the resonator.

However, the device in accordance with this German publication is intended primarily for measuring the blood pressure in the human body, and as such it is devised for comparatively low pressures, in the range of 1 bar, and for temperatures in the range of 20°–40° C., i.e. close to room temperatures. The pressure to be measured inside a combustion engine cylinder, on the other hand, may amount to 200 bars at normal operational temperatures of 250° C. In addition to the requirements for productional efficiency as mentioned above, a sensor of this kind therefore has to meet high demands also as regards material, manufacturing technique and reliability, and the sensor disclosed in DE 3611852 fails to do so.

Another disadvantage inherent in the device mentioned above concerns the nature of the attachment of the optical fiber included therein to the sensor body. The sensor body is said to be Joined to the fibre by means of clamping. This securement method as well as more permanent mounting methods, such as glueing, are not, however, sufficiently strong or resistant to pressure and heat to fulfill the demands that devices intended for applications of the kind contemplated by the present invention must meet. In addition, the layer of glue that results from glueing an optical fiber to the sensor body will disturb the path of the light rays into and out of the sensor body.

SUMMARY OF THE INVENTION

The subject invention thus is concerned with a method of manufacturing a device for measuring the pressures in an environment wherein high pressures and temperatures prevail as also severe electrical disturbances, which device in addition may be manufactured and installed at low costs. These aims are achieved by means of a method and a device in accordance with the invention.

The mounting or securement problem is solved in accordance with the subject invention by a method known as "Silicon Direct Bonding", in the following referred to as SDB. This method, which is known since 1986 (Lasky, Applied Physics Letters Vol. 48, p. 78, 1986) makes it possible to bond silicon to silicon, silicon to silicon dioxide and silicon dioxide to silicon dioxide. The bonding process proper is effected by contacting two polished surfaces of any of the material combinations mentioned, at a temperature of 700°–1000° C. (Bengtsson and Engström, Journal of Applied Physics, Vol. 66, p. 1231, 1989 and Journal of Electrochemical Society, 137, p. *2297, 1990*). The bond thus produced has a tensile strength corresponding to the strength of the bonding materials as such, and they are extremely temperature resistant.

The invention allows the fibre-optical pressure sensor to be manufactured in a mechanical manufacturing process. Because the sensor body is made from silicon the highly developed silicon technology used in the manufacture of printed circuits is available for efficient batch production of sensor bodies.

BRIEF DESCRIPTION OF THE DRAWINGS

Additional characteristics and specific features will appear from the dependent claims and the following detailed description of various embodiments with reference to the accompanying drawings, wherein FIGS. 4A–4B and 5A–5B are alternative embodiments of the invention, whereas

DETAILED DESCRIPTION OF THE ILLUSTRATED EMBODIMENTS

Figure 1:
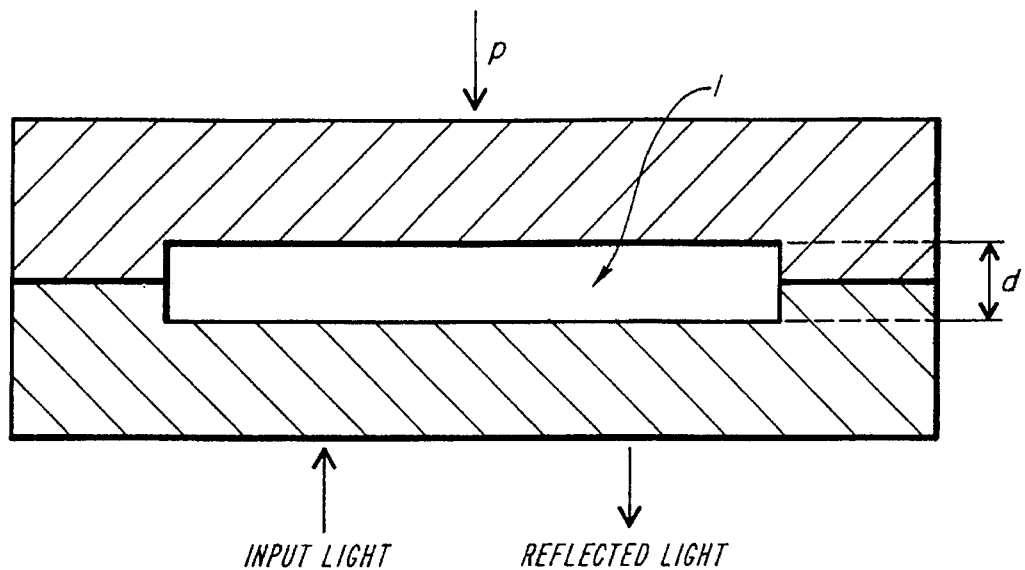
FIG. 1 illustrates the design of a Fabry-Pérot resonator.

FIG. 1 shows the operational principle, known per se, of a Fabry-Pérot resonator. Light incident on the cavity 1 is reflected by both the interior surfaces thereof. Resonance is generated when the width, d, of the cavity is equal to a number of half wave-lengths of the incident light (d=($\lambda$/2)×n, wherein n=0, 1, 2, . . . ). In this case no light is reflected back from the cavity 1. By varying d, the intensity of the reflected light thus passes through a number of maximum and minimum values, depending on the relationship between the width d and the wavelength of the light. This principle may be used for pressure measurement purposes, because d can be assumed to be dependent on the pressure, p, around the cavity 1.

Figure 2A:
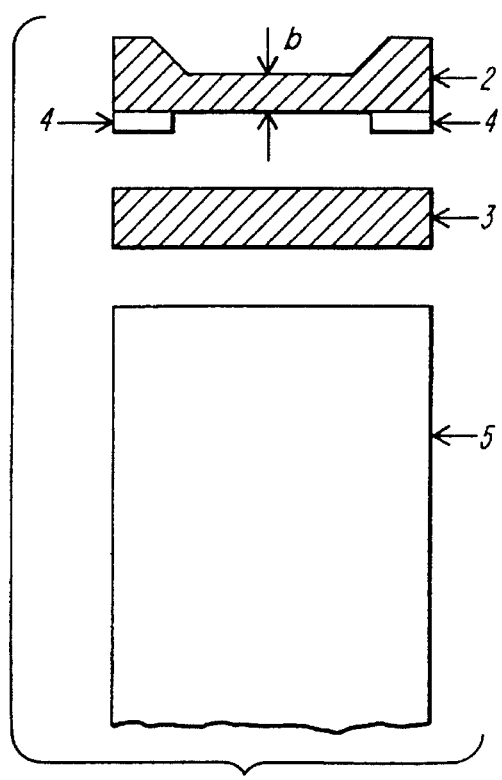
FIGS. 2A and 2B illustrate a pressure sensor in accordance with the subject invention.
Figure 2B:
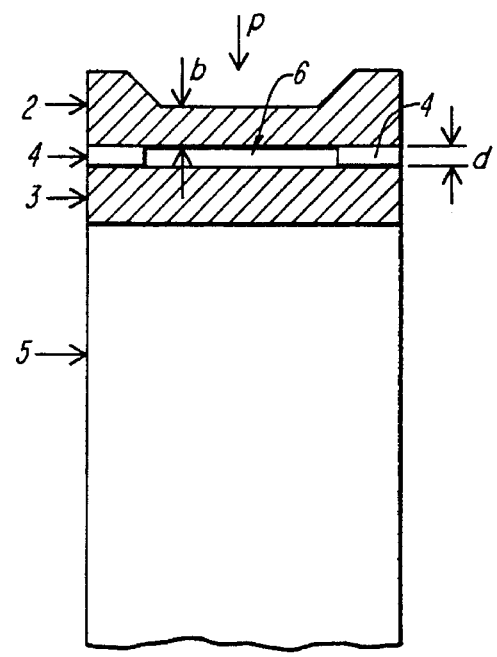

FIGS. 2A and 2B illustrate a preferred embodiment of the subject invention. Two different pieces of silicon 2 and 3 are bonded together by means of a layer 4 of silicon dioxide arranged in a pattern. The sensor element thus produced is in turned joined to the end of an optical fiber 5 using the SDB method. Because one, 2, of the silicon pieces is coated with the silicon over only a limited portion of its area, a cavity 6 is formed intermediate the silicon pieces 2 and 3 after bonding, the width, d, of which is determined by the thickness of the silicon dioxide coating 4. There is nothing to prevent application of the silicon dioxide coating 4 to the other silicon piece 3 too, or application of patterned silicon dioxide to both silicon pieces 2, 3. The device is shown in FIG. 2A prior to the joining together whereas FIG. 2B shows the end result, after the joining process. The width, d, of the cavity is critical and must be made to an accuracy of fractions of the light wavelength $\lambda$ of the interfering light if reproducible sensor bodies are to be obtained in a production process. For this reason the silicon dioxide layer 4 preferably is obtained through thermal oxidation. This process is well-known within the semiconductor technology and lends itself to sufficiently precise prediction of the thickness of the silicon dioxide layer 4. Also the method of arranging oxide in a pattern on a silicon surface is a routine practice within the semiconductor technology and can be effected with extreme accuracy as regards the pattern measures. Bonding using the SDB technique is effected in an oven at a temperature around 1000° C. The pressure sensitivity is determined by the thickness, b, of one, 2, of the silicon pieces. This thickness b can be carefully determined through the well-established etching methods used within the semiconductor technology.

Figure 3:
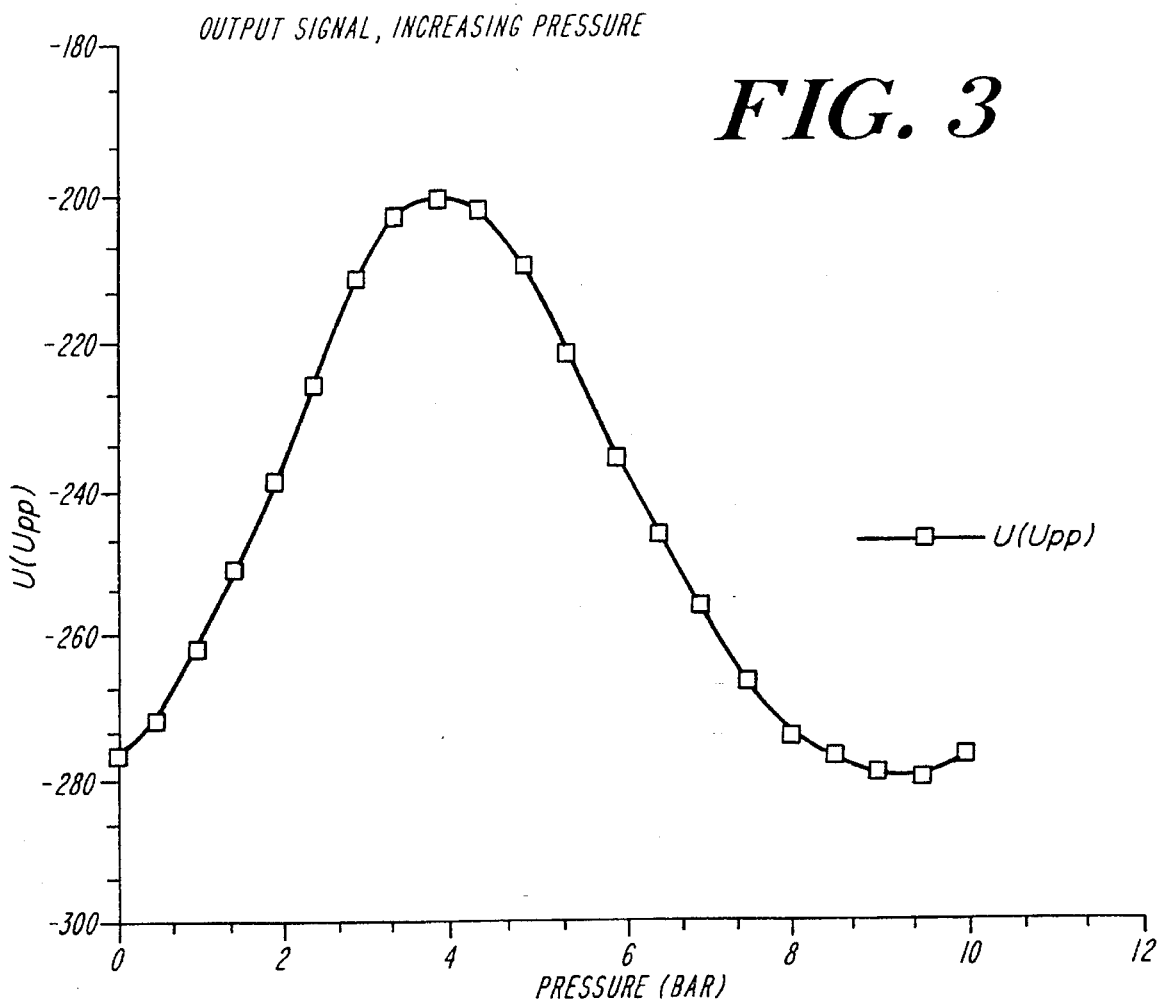
FIG. 3 shows examples of results obtained from measurements effected with the aid of a device in accordance with the invention.

FIG. 3 shows a measuring result obtained from a sensor manufactured in accordance with FIGS. 2A and 2B. In this case, the wavelength A of the light was approximately 1.4 µm and the width of the cavity 6 of the same magnitude. A pressure of p=0 therefore gives a minimum value of the light signal reflected inside the fibre. A pressure of approximately p=4.5 bar gives a maximum value and resonance occurs again at 9 bar when the width of the cavity 6 is reduced by half. A sensor of this kind probably is most suitable for use within the pressure range of 0–4 bars. The pressure range can be altered easily by modifying the thickness b of the silicon piece 2.

The pressure sensor in accordance with FIGS. 2A and 2B suffers from the drawback that it must be possible to transmit through the silicon piece 3 the light which is used inside the resonator formed by the cavity 6. This imposes a restriction as regards the useful wavelength range of the light. Its photon energy must be smaller than the band gap of silicon in order to allow transmission of the light. In other words, only light wavelengths exceeding 1.1 µm may be used. However, commercially available light sources and detectors for these wavelength ranges are comparatively expensive. One way of avoiding this problem is to use a silicon piece 3 having a thickness of the same dimensions as the penetration depth of the light that is used. For a wavelength of 0.9 µm of the light, which corresponds to the wavelength of commercial light-emitting diodes of gallium arsenide, the penetration depth is about 10 µm. To produce a silicon body 3 having a thickness of this magnitude is quite possible using available etching technique.

In accordance with another embodiment the problem is solved in that the silicon piece 3 is replaced by a material which is transparent to light of shorter wavelengths and which lends itself to bonding with silicon dioxide using the SDB technique. Examples of materials of this kind is quartz or saphire.

Figure 4A:
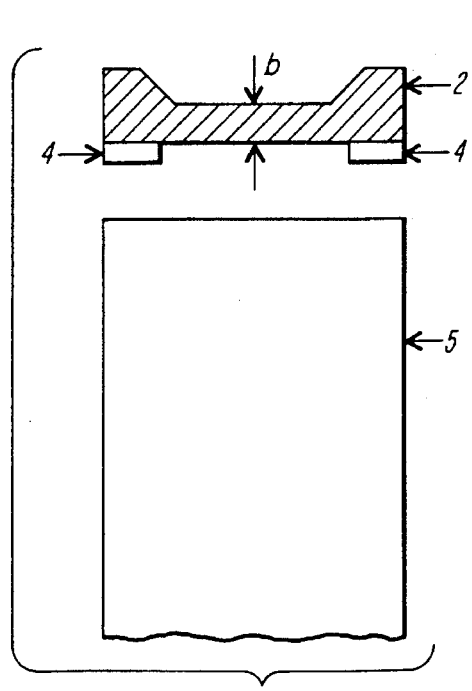
Figure 4B:
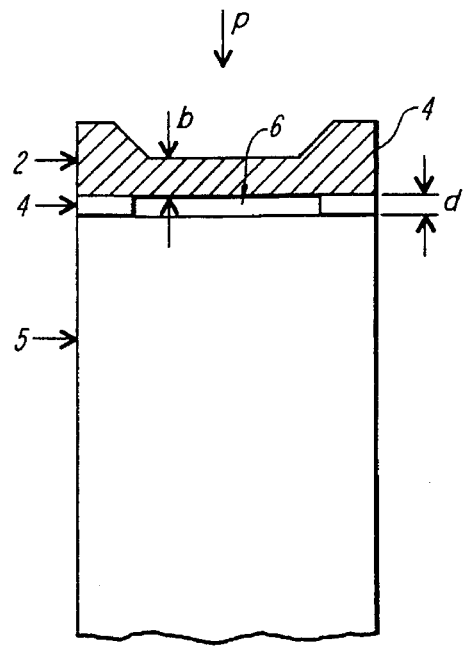

Yet another solution is shown in FIGS. 4A and 4B according to which the silicon body 2 with the layer of silicon dioxide 4 applied thereon is joined directly to the optical fiber 5 by means of the SDB bonding technique. In this case, the cavity 6 is formed between the surface of the optical fiber 5 and the inner face of the silicon piece 2, and consequently it is accessible to light of arbitrary wavelength.

Additional embodiments are possible according to which another material than thermal silicon dioxide is used as the layer determining the width d. Silicon dioxide applied through a chemical method (the method known as Chemical Vapor Deposition, CVD), silicon nitride, polycrystalline or amorphous silicon are other examples. All these materials are well known from the semiconductor technology.

Figure 5A:
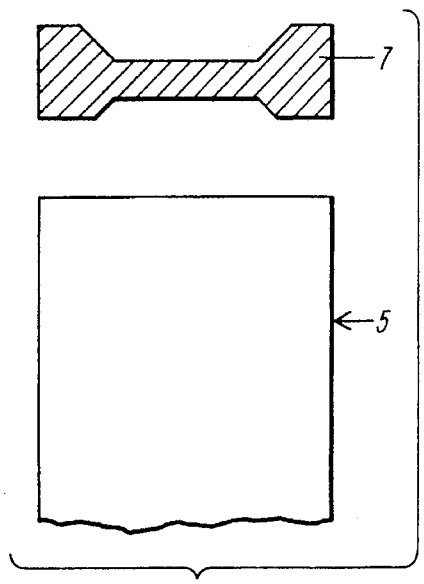
Figure 5B:
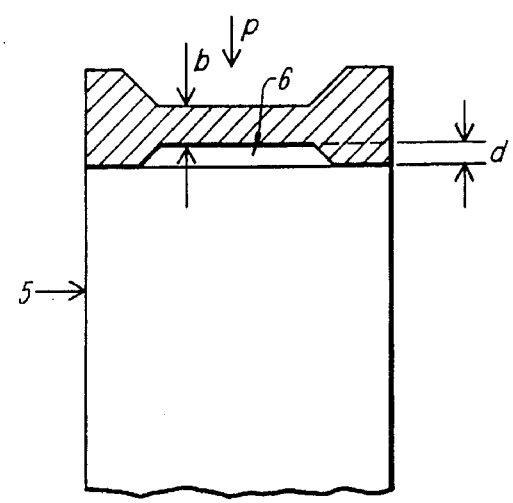
Figure 6A:
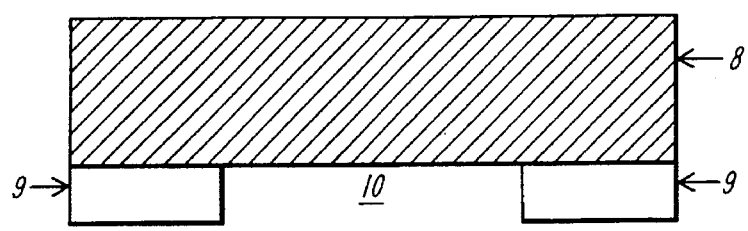
FIGS. 6A–6C illustrate a method of manufacturing the inventive object.
Figure 6B:
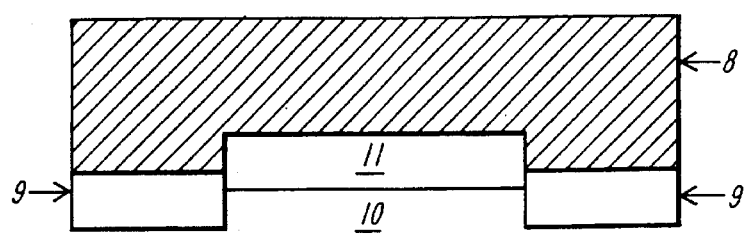
Figure 6C:
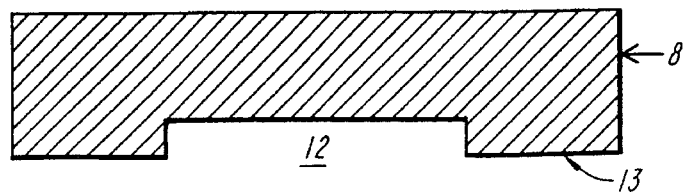

As illustrated in FIGS. 5A and 5B it is possible, in accordance with another embodiment, to obtain a controlled width a of the cavity 6 by forming a cavity directly in the mass of the silicon piece 7. In this case the silicon piece 7 is joined directly to the optical fiber 5 without any intermediate layer (cf. layer 4 in FIGS. 2 and 4). In accordance with this embodiment, the cavity 6 is produced in the manner appearing from FIGS. 6A–6C. A silicon disc 8 is oxidized to produce a comparatively thick layer of silicon dioxide over the entire disc surface. An opening 10 is etched in the silicon dioxide using standard semiconductor technology, as shown in FIG. 6A. The disc is thereafter subjected to additional thermal ozidation. A new silicon dioxide layer 11 then grows inside the opening 10 (FIG. 6B). Upon thermal oxidation of the silicon the interface between the silicon dioxide and the silicon is formed at a distance from the original silicon surface that corresponds approximately to half the thickness of the silicon dioxide layer 11. Because the silicon dioxide layer 9 acts as a mask preventing oxidation of the rest of the silicon surface the interface silicon dioxide/silicon will be positioned at a deeper level in the opening 10 than the interface silicon dioxide/silicon in the rest of the disc. By subsequently etching the disc with an etching agent that acts selectively and etches only oxides (such as HF) a pure silicon surface is obtained, including a pit 12 the depth of which is determined by the thickness of the oxide grown in the opening 11 (FIG. 6C). In this manner a raised portion 13 is formed around the pit 12. The depth of the pit 12 may be determined very precisely in advance because it is possible to predict with great accuracy the thickness of the silicon dioxide layer and it is used in the same manner as the cavity 6 in the embodiment in accordance with FIGS. 5A and 5B.

In accordance with yet another embodiment a piece of silicon 7 (according to FIGS. 5A and 5B) may be bonded to a silicon piece 3, whereupon the sensor body thus produced is joined to the end of the optical fibre 5.

Figure 7:
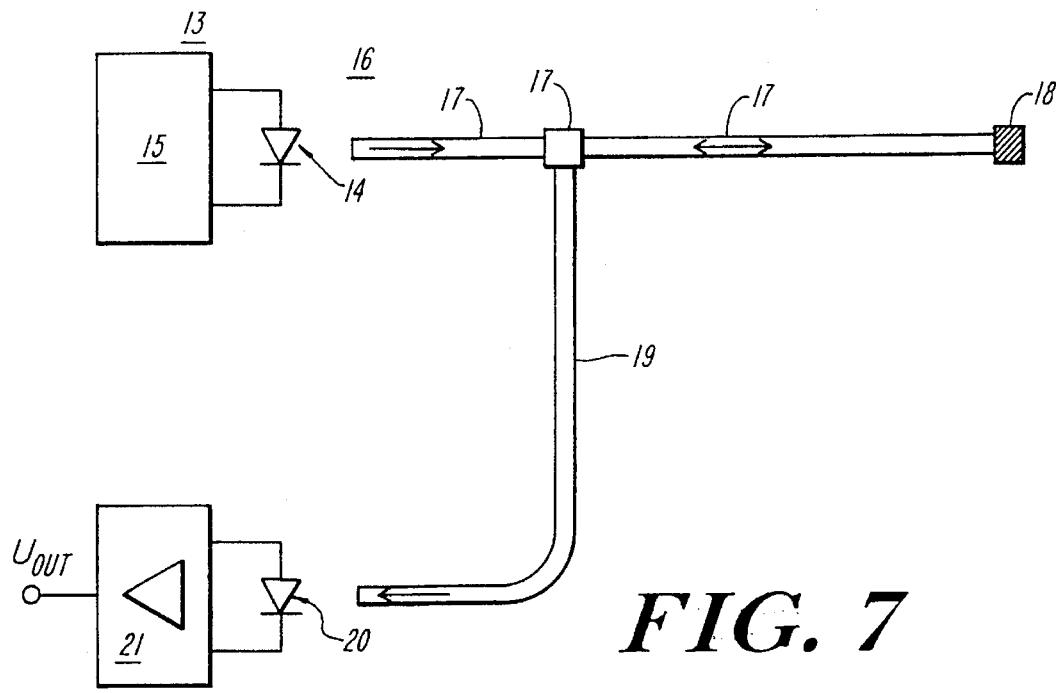
FIG. 7 illustrates schematically a pressure measuring system.

FIG. 7 illustrates schematically a pressure measuring system including one of the sensor elements 18 described in the aforegoing. The system comprises a source of light in the form of a light-emitting diode 14 which is connected to a source of current 15. The light-emitting diode is connected to one branch 16 of a branched optical fiber 17. The light from the diode 14 is transmitted through the fibre to the sensor element 18 in the manner described above, and is re-transmitted back through the fiber 17. A portion of the returning light enters the fiber branch 19 which is connected to a photo-sensitive member 20, which member may be a photodiode or a phototransistor. The member 20 detects the modulated light signal and converts it into an electric signal which is amplified by amplifier 21 and provides an electric signal $U_{out}$ on the amplifier output. Since the intensity of the return light inside the fibre depends on the pressure, p, that is applied to the sensor element 18, the electrical signal $U_{out}$ from the amplifier is a measure of the pressure p. Some light is not reflected but is modulated by the sensor element 18. As appears from FIG. 3, the modulated part of the light intensity amounts at least to about 40% of the total light, for which reason detection of any variation of the pressure p can be conveniently made.

No means are included in the pressure measuring system 13 to compensate for variations of intensity arising as a result of bends in the fiber 17. However, wherever necessary such compensating measure could be effected, using any prior-art method, such as the one disclosed in the Swedish Published Specification SE 431 259, and be installed in the measuring system 13.

Obviously, the measurement amplifier may be connected to, alternatively integrated with, the existing ignition and/or fuelling systems of the vehicle, thus allowing the pressure signal from the device in accordance with the invention to be included as one of the parameters of those systems.

Figure 8:
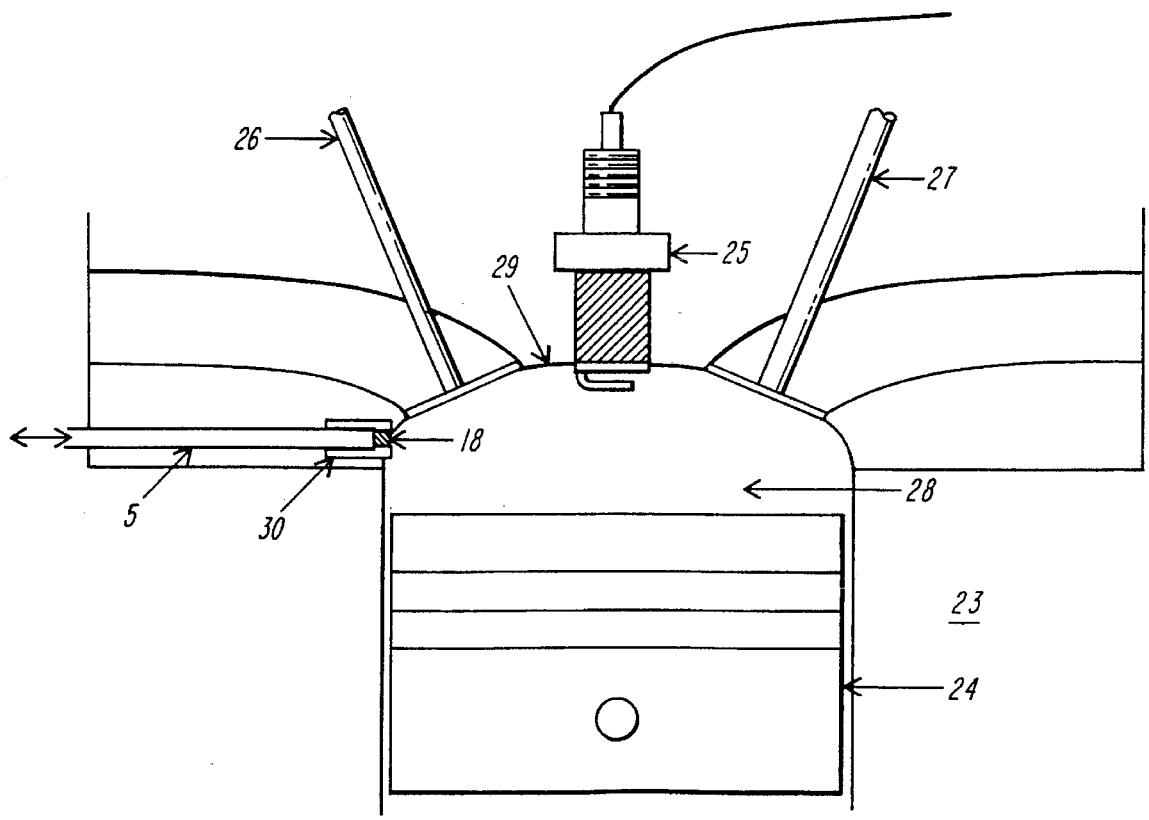
FIG. 8 illustrates a possible mounting method of a measuring device in an engine cylinder.

FIG. 8 illustrates the upper part of a combustion engine 23 which in the conventional manner comprises a piston 24, spark plugs 25 and valves 26, 27. The engine 23 may be equipped with an electronic fuel-injection system. The sensor element 18 is positioned adjacent the combustion chamber 28 of the engine 23 in such a manner that the outer edge of the sensor element 18 will be essentially level with the wall 29 of the combustion chamber 28. For this purpose, the sensor element 18 and the optical fiber 5 associated therewith are positioned in a through-hole by means of a nipple bolt 30 which is mounted in the cylinder wall 29. The sensor element 18 may be built to very reduced dimensions, making it possible to mount it inside channels in or adjacent other cylinder lead-in elements, such as spark plugs and valves.

The sensor element in accordance with the invention could comprise more than one cavity, for instance when there is a need for measuring more than one area in the device.

We claim:

1. A method for manufacturing a device for measuring pressure comprising a cavity of the Fabry-Pérot resonator type and a first part and a second part, said parts sandwiching said cavity between them, in which at least said first part consists of silicon and a spacer portion is arranged between the parts, and in which the pressure around the cavity is measured by directing light towards the cavity, the light returning from the cavity thereafter being detected, wherein the cavity is formed by arranging the spacer portion on at least the first part, using a method of building up molecular layers, and removing a part of the spacer portion by an etching method, and that the spacer portion is joined to the second part using "direct bonding" (Silicon Direct Bonding, SDB).

2. A method as claimed in claim 1, wherein the first part is subjected to a thermal oxidation, that the silicon dioxide layer then formed is partially removed by etching, and that the direct bonding (SDB) is effected between the remaining silicon dioxide portions and the second part.

3. A method as claimed in claim 1, wherein the first part is subjected to thermal oxidation, that thereafter a portion of the silicon dioxide layer thus formed is removed by etching, that the first part provided with the silicon dioxide layer is subjected to a second thermal oxidation process in which at least one raised portion is formed in the first part, and in that the silicon dioxide layers thus formed are removed by etching and the direct bonding (SDB) is effected between said raised portion and said second part.

4. A device for measuring pressure, comprising a cavity and a first part and a second part, said parts sandwiching said cavity between them, at least said first part consisting of silicon, wherein the first part is formed with a spacer portion which is produced by means of a method of building up molecular layers and an etching method, said spacer portion being joined to the second part using "direct bonding" (Silicon Direct Bonding, SDB).

5. A measuring device as claimed in claim 4, wherein the second part is the end portion of an optical fiber.

6. A measuring device as claimed in claim 4, wherein the second part consists of a substance which is transparent to visible light.

7. A measuring device as claimed in claim 6, wherein the second part consists of quartz, saphire or other transparent material.

8. A measuring device as claimed in claim 4, wherein the second part consists of a piece of silicon which is joined to an optical fiber by means of direct bonding (SDB).

9. A measuring device as claimed in claim 4, wherein the second part is a piece that is transparent to visible light and which is joined to an optical fiber by means of direct bonding (SDB).

10. A measuring device as claimed in claim 9, wherein the second part consists of quartz or sapphire.

* * * * *